June 30, 1970 — L. O. MAIN — 3,518,523

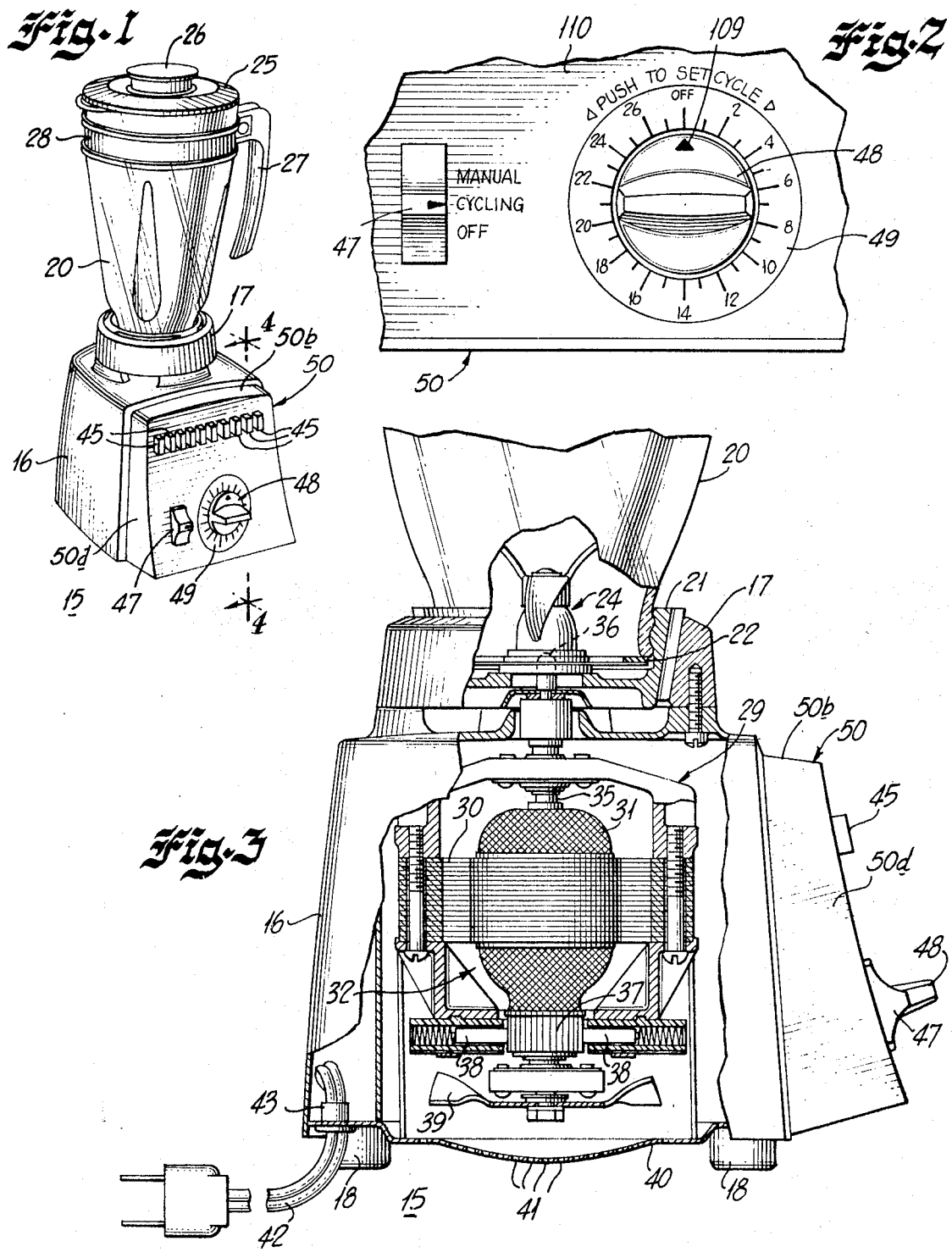

CONTROL MEANS FOR BLENDER OR THE LIKE

Filed June 12, 1967 — 4 Sheets-Sheet 2

INVENTOR
LAUREN O. MAIN
by George R. Clark.
ATTORNEY

June 30, 1970  L. O. MAIN  3,518,523
CONTROL MEANS FOR BLENDER OR THE LIKE
Filed June 12, 1967  4 Sheets-Sheet 3
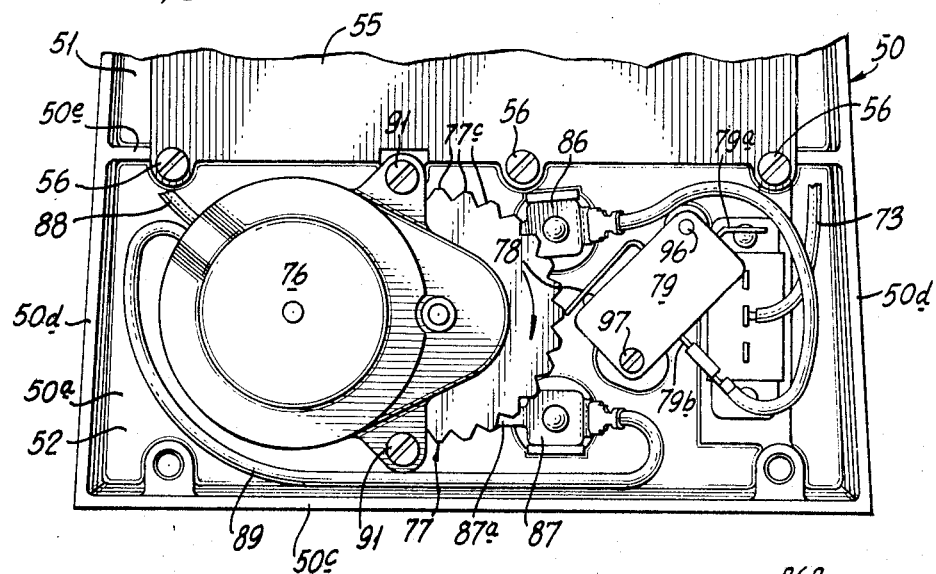
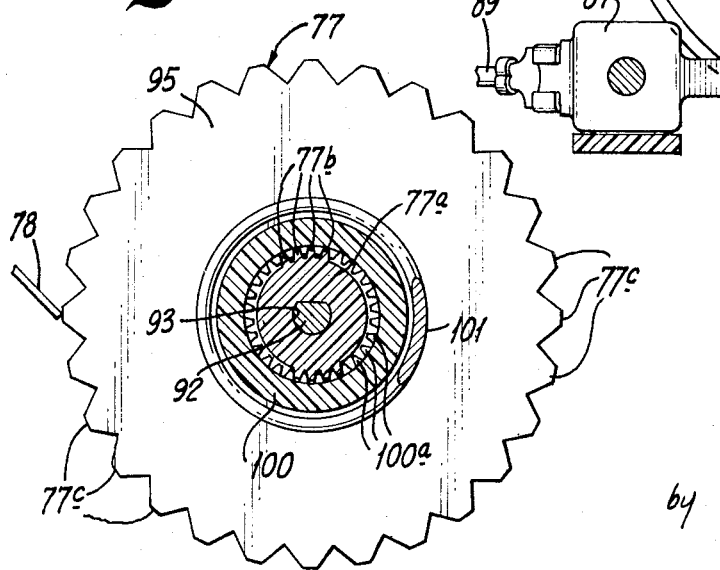
INVENTOR
LAUREN O. MAIN
by George R. Clark
ATTORNEY

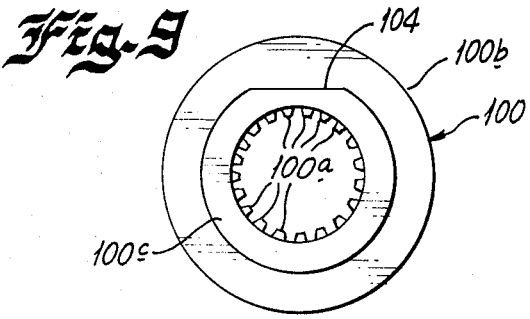
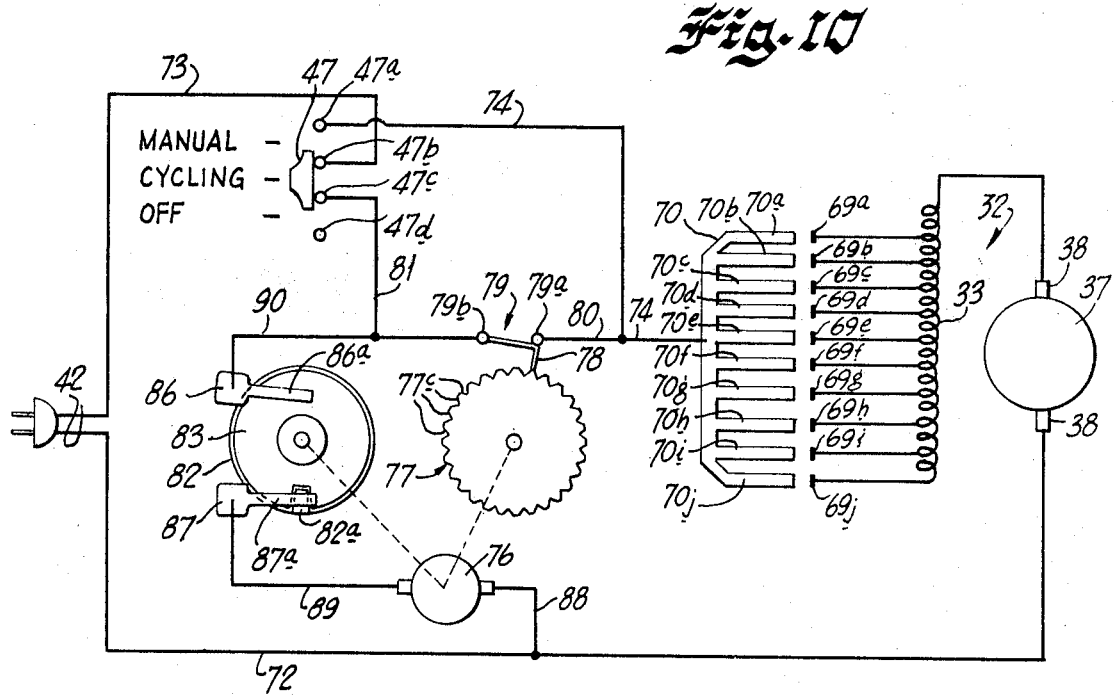
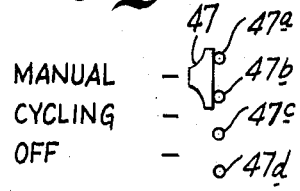
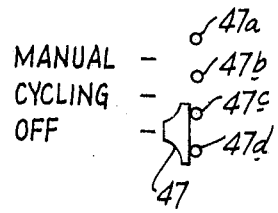

United States Patent Office 3,518,523
Patented June 30, 1970

3,518,523
CONTROL MEANS FOR BLENDER OR THE LIKE
Lauren O. Main, Brown Deer, Wis., assignor to John Oster Manufacturing Co., Milwaukee, Wis., a corporation of Wisconsin
Filed June 12, 1967, Ser. No. 645,331
Int. Cl. H02p 1/04, 5/00, 7/00
U.S. Cl. 318—443      15 Claims

ABSTRACT OF THE DISCLOSURE

Automatic intermittent mechanical control for a blender whereby the blender motor may be set to cycle and when so set the motor automatically runs for a brief period, then stops, then runs for a brief period, and so on, for a selected predetermined number of cycles, greatly to speed up a chopping or other function performed by the blender.

---

The present invention relates to a blender and, more particularly, to improved automatic control means for such a blender. Specifically, the present invention is an improvement on the control disclosed in copending Cockroft application Ser. No. 645,330 filed concurrently herewith and assigned to the same assignee as the present application.

An appliance which has been extensively sold, particularly in recent years, is commonly termed a blender. The blender actually performs many functions depending upon the speed of the rotating blades which are usually disposed near the bottom of a removable mixing container. A blender may be used for crumbing, chopping, grating, grinding, pureeing, liquefying, blending, whipping and mixing operations as well as for many other purposes. When a blender is operated, the liquid or mixture, including solid particles, is rotated at high speed throughout the extent of the mixing vessel. Unless the solid particles return to the bottom adjacent the blades, they will not be further chopped, ground, etc. It has been found that much of the rotating mass of material does not return to engage the rotating blades and, hence, is not further liquefied or cut up except upon the lapse of an inordinate amount of time. It has been found that if the blender, after being run for a short period of time, is shut off, or the speed thereof substantially reduced and then started or speeded up again, with this periodic or intermittent starting and stopping repeated a number of times, the mass of rotating material falls down to the knives or rotating cutting means and the chopping or other operation can be performed much more quickly if such intermittent control is provided. A similar improved operation is obtained by intermittent speed changes of the blender motor, providing the lower speed is relatively low.

Accordingly, it is an object of the present invention to provide an improved automatic intermittent control means whereby such a blender may be operated not only in the conventional manner to perform its many different functions but may be set to be automatically turned on and off intermittently to insure the desired chopping, blending, liquefying, etc. operation.

It is a further object of the present invention to provide improved control means for accomplishing automatic intermittent operation of a blender.

Still another object of the present invention resides in an improved blender control which is simple and compact, which can be manufactured at low cost and which will give many years of foolproof operation.

Another object of the present invention resides in improved control means for periodically energizing a blender motor to obtain the most efficient operation of the blender.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of a blender incorporating one embodiment of the present invention;

FIG. 2 is an enlarged fragmentary view of a portion of the control panel of the blender of FIG. 1 showing the control knob determined by the number of cycles selected in the "OFF" position, the main control knob in the cycling position, and with none of the push buttons controlling the various motor speeds being actuated;

FIG. 3 is an enlarged elevational fragmentary view, with certain portions cut away, of the blender of FIG. 1 with the controls in the position shown in FIG. 2;

FIG. 6 is a fragmentary view, reduced in size, looking in the direction of the arrows 6—6 of FIG. 4 illustrating the switch for causing intermittent operation of the blender motor in the closed position, and assuming that FIG. 4 shows the complete structure;

FIG. 7 is a sectional view taken on line 7—7 of FIG. 4, again assuming that FIG. 4 shows the complete structure and with some of the background elements deleted;

FIG. 8 is a sectional view taken on line 8—8 of FIG. 4 of the drawings, also assuming that FIG. 4 shows the complete structure and with some of the background elements deleted;

FIG. 9 is a front elevational face view of a clutch member employed in the blender control mechanism of the present invention looking in the direction of the arrows 9—9 of FIG. 4 of the drawings, also assuming that FIG. 4 shows the complete structure;

Figure 5:
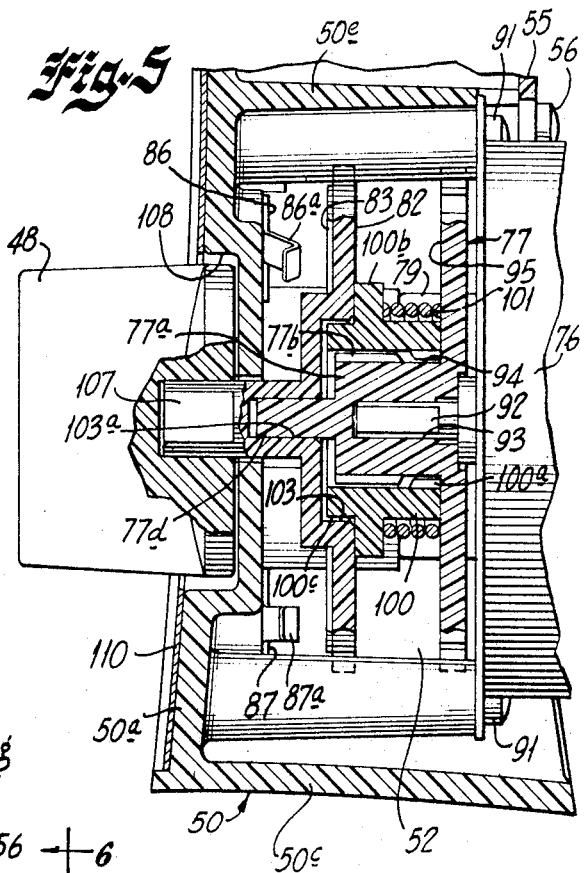
FIG. 5 is a fragmentary view of FIG. 4 during the setting of the knob controlling the number of cycles selected rotated in a clockwise direction through an angle of 90° as viewed in FIG. 2 of the drawings, to the seven cycle position on the dial but with the knob still held in the depressed position.

FIG. 10 is a schematic circuit diagram of the blender control of the present invention with the controls set in the position of FIGS. 1 and 2 of the drawings and with the main control switch set for cycling or intermittent operation, as also shown in FIG. 6 of the drawings; and FIGS. 11 and 12 are fragmentary views of FIG. 10, but showing the main control switch in the "OFF" or "MANUAL" positions, respectively.

Briefly, the present invention is concerned with an automatic intermittent control for a blender effectively to cycle the operation of the blender motor. Much better engagement between the blades and the contents of the blender vessel can be achieved if the motor is turned on and off for short intervals of time. Mechanical means are provided to produce the intermittent or periodic control of the blender motor during the operation when the device is set for automatic cycling.

It will be appreciated that various means may be employed to provide the intermittent or cyclic operation of the blender motor. For example, an electrical means or an electronic means employing solid state elements could be employed for causing the cyclic operation of the blender motor whereby these elements will cause the motor to be energized for a short interval of time, then deenergized, then energized and so on, in a selected predetermined manner. Such an arrangement is disclosed in the aforesaid copending Cockroft application.

In order to illustrate the resent invention, however, mechanical means for accomplishing the cyclic operation of turning the blender motor on and off are illustrated. It should be understood that the present invention is not limited to intermittent energization and deenergization of the blender motor, but also encompasses intermittent change of speed of the blender motor and it is intended in the broader claims to cover either starting and stopping or substantial intermittent changes in motor speed for accomplishing the functions described in detail hereinafter.

Referring now to the drawings and more particularly to FIGS. 1 to 3 thereof, there is illustrated a blender incorporating the control means of the present invention generally designated by the reference numeral 15. The particular construction of the blender itself, aside from the control means, forms no part of the present invention but is merely illustrated to include a complete disclosure. As illustrated, the blender unit 15 comprises the conventional base 16 having supported at the top the container holder 17. The base is preferably supported on suitable legs or bumpers 18 (FIG. 3). A suitable container 20 has the bottom thereof closed by suitable container bottom 21 threaded thereto and making sealing connection therewith by means of the well known diaphragm seal 22. The container bottom supports the conventional agitator assembly 24. Preferably, the top of the container 20 is closed by a suitable top cover 25 which, in turn, may have a removable filler cap 26. A suitable handle 27 is preferably secured to the container 20 by a flexible strap 28 in a well known fashion.

In order to drive the agitator assembly 24, there is mounted within the base 16 a suitable motor mounting assembly 29 which supports the field structure 30 and the armature 31 of an electric motor generally designated at 32. The field structure 30 preferably includes a tapped field winding 33 schematically shown in FIG. 10 of the drawings. As is best shown in FIG. 3 of the drawings, the armature 31 is mounted on a suitable armature shaft 35 which is adapted to rotate the drive means 36 which may, for example, comprise a square shaft for making releasable driving engagement with the agitator assembly 24. As illustrated, the motor 32 includes a commutator 37 with which conventional spring biased brushes 38 engage.

To insure proper cooling of the motor 32, a suitable fan 39 is secured to the armature shaft 35 so as to be rotatable therewith. Preferably a base cover 40 closes the bottom of the base 16 and is provided with a plurality of openings 41 to permit cooling air to circulate around the motor structure. A conventional power cord 42 entering the base 16 through a cord bushing 43 insures a power supply for energizing the motor 32.

For the purpose of insuring proper operation of the motor 32 to perform the various functions which the blender 15 of the present invention is intended to perform, it has been found desirable to have as many as ten distinct and separate speeds of the motor 32. For example, such a blender when used to stir food operates at a relatively low speed. The speed should increase slightly when pureeing foods, should increase still more when mixing foods and should become successively higher when the blender is used for chopping, grinding blending, liquefying and the like.

As illustrated in FIG. 1 of the drawings, the blender 15 is provided with a plurality of push buttons 45, ten of them being shown in the drawings. The push buttons 45 are all identical and the details of one such push button is clearly illustrated in FIG. 4 of the drawings. The push button feature forms no part of the present invention but preferably may be identical with the arrangement disclosed and claimed in a copending application of Edwards and Cockroft, Ser. No. 596,962, filed Nov. 25, 1966, and assigned to the same assignee as the instant application. With such a push button control, as will be only briefly described hereinafter, it is desirable to have a master control member which, in accordance with the present invention, is illustrated as a sliding control member 47 capable of assuming three different positions designated in FIG. 2 of the drawings as an uppermost "MANUAL" position, an intermediate "CYCLING" position and a lowermost "OFF" position.

In addition to the push buttons 45 and the sliding control member 47, there is also provided in accordance with the present invention a cycle selector button 48 which is adapted to be depressed and then rotated to a predetermined selected number of cycles. Associated with the cycle selector button 48 is a suitable dial 49 which is marked off in cycles from one to twenty-eight, knob 48 being shown in the "OFF" or zero selected number of cycles position setting.

In order to house the push buttons 45 and associated control means, the sliding control member 47 and the cycle selector button 48, there is provided a switch block or shallow housing 50 which is adapted to be secured to one side, and preferably a partially open side, of the base 16 by suitable screws or fastening means (not shown). The switch block or shallow housing 50 is preferably molded from a suitable nonconducting plastic such as a general purpose phenolic resin. The switch block or shallow housing 50 is provided with a front wall portion 50a, a top wall portion 50b, a bottom wall portion 50c and similar side wall portions 50d (FIG. 6), only one side wall portion being visible in FIGS. 1 and 3 of the drawings. A suitable central partition 50e (FIGS. 4, 5 and 6) integrally molded with the wall portions 50a, 50b, 50c and 50d divides the shallow housing 50 into an upper push button switch chamber 51 and a lower cyclic control chamber 52.

Considering now very briefly the push buttons 45 and associated control mechanisms mounted in the push button switch chamber 51, the push buttons and associated control mechanisms are preferably identical with those described in detail in the copending Edwards and Cockroft application referred to above. To accommodate the push buttons the upper portion of the front wall 50a of the switch block 50 is provided with a plurality of openings 54 (FIG. 4), one for each of the push buttons 45. For the purpose of closing the rear portion of the chamber 51 and also to support contact members, there is provided a contact board assembly 55 secured to the switch block 50 as by a suitable fastening means 56. As illustrated, each of the push buttons 45 is hollow and has contained within the chamber 57 defined therein a spring retainer 58 and a spring 59, the latter being a compression spring urging the spring retainer 58 against the contact board assembly 55 and consequently biasing the push button 45 to the extended position shown in FIG. 4 of the drawings.

As is fully disclosed in the above mentioned copending Edwards and Cockroft application, each push button includes a pair of adjacent pockets or recesses 60 and 61 in one side thereof, separated by a cam portion 45a preferably integrally molded with the associated plastic push button 45. Pivotally mounted on a hinge pin 63 supported within chamber 51 is a latch plate 64. One or more suitable springs 65 bias the latch plate 64 in a counterclockwise direction about hinge pin 63, as viewed in FIG. 4 of the drawings. The latch plate 64 is provided with a curved hook-shaped end 64a. It will be appreciated that when a push button 45 is depressed, the cam portion 45a will engage the portion of the latch plate 64 disposed within recess 60 and cause it to rotate in a clockwise direction about hinge pin 63, as viewed in FIG. 4 of the drawings, against the bias of spring 65 until it passes over the bottom surface of cam 45a of the particular push button 45 being actuated, after which it moves into the recess 61 and portion 64a of latch plate 64 latches the push button 45 in its depressed position. As is fully disclosed in the copending Edwards and Cockroft application referred to above, it will be apparent that the depression of any push button 45 will cause its associated cam portion 45a to engage the latch plate 64 and hence release any other button which might have been latched in operating position. Moreover, as is also fully disclosed in the above mentioned copending Edwards and Cockroft application, provided with each of the push buttons 45 are slider members 67 spaced in such a manner relative to the total number of slider members, one for each of the push buttons 45, that only one push button can be depressed at any one time to an operative position even though the operator tries to actuate two of them simultaneously.

Figure 4:
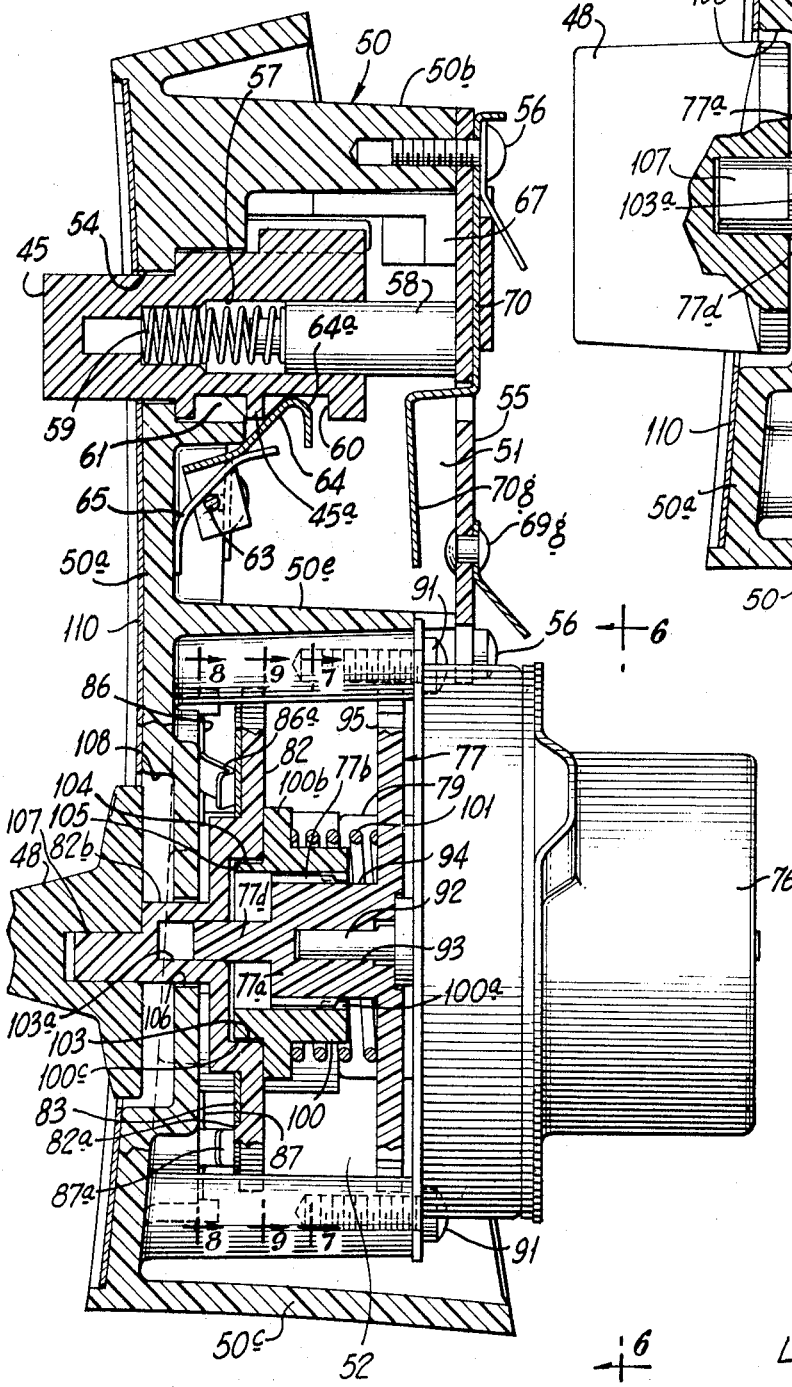
FIG. 4 is a greatly enlarged sectional view taken on line 4—4 of FIG. 1 illustrating the details of one embodiment of the present invention for producing automatic blender operation and with the controls in the position shown in FIGS. 1 and 2 of the drawings.

For the purpose of selectively energizing a predetermined tap (and consequently selecting a predetermined speed of blender motor 32) on the field winding 33 of the electric motor 32 (FIG. 10 of the drawings) the contact board assembly 55 supports a plurality of electric contacts generally designated as 69, a specific one being shown in FIG. 4 of the drawings designated by the reference numeral 69g. Actually, one of these contacts is provided for each of the push buttons 45 and, as illustrated in FIG. 10 of the drawings, ten such contacts 69 are provided designated at 69a, 69b, 69c, 69d, 69e, 69f, 69g, 69h, 69i and 69j, each connected to a different tap on the field winding 33 of the motor 32.

To complete an electrical circuit at a particular one of the contacts 69a to 69j, inclusive, there is mounted on the contact board assembly a common contact 70, also shown in FIG. 10 of the drawings, and extending across the extent of the push buttons 45. This common contact is an elongated contact member having a plurality of projecting spring fingers designated as 70a to 70j, inclusive, corresponding to the subscripts on the contacts 69a to 69j, inclusive.

For the purpose of controlling the blender motor 32, the sliding knob 47 of the master control, as best shown in FIGS. 10, 11 and 12 of the drawings, is associated with a switch effectively having a plurality of contacts 47a, 47b, 47c and 47d. When the switch is in the intermediate position, shown in FIGS. 1, 2 and 10, the blender is in the "CYCLING" control position described in greater detail hereinafter. When the switch is in the uppermost or "MANUAL" position, shown in FIG. 12 of the drawings, then the blender operates in the normal manner and when the switch is in the "OFF" position, shown in FIG. 11 of the drawings, no power is supplied to the motor 32 regardless of the condition of any of the other elements such as the push buttons 45 and the knobs 47 and 48.

In order to complete the circuit so that the "MANUAL" and "OFF" positions of the main control knob 47 will perform their function, the electrical circuits for these connections will now be briefly described with reference to FIG. 10 of the drawings. As there is illustrated, one of the brushes 38 of the motor 32 is connected by conductor 72 to one side of the power line 42. Similarly, the other side of the power cord 42 is connected by a conductor 73 with the contact 47b of the main control switch 47. The contact 47a of the main control switch 47 on the other hand is connected by a conductor 74 with the common contact 70 described heretofore. With this arrangement, it will be readily apparent that when the knob 47 is moved to the "MANUAL" position shown in FIG. 12 of the drawings, the motor 32 will be energized providing one of the push buttons 45 is actuated to cause the associated finger of the common contact 70 to engage one of the stationary contacts 69, the speed of rotation depending upon the particular one of these push buttons that is actuated. When, on the other hand, the switch button 47 is moved to the "OFF" position, shown in FIG. 11 of the drawings, then no power will be supplied to the blender motor regardless whether or not any push buttons 45 are actuated.

To operate the blender 15 in an intermittent manner, in other words to automatically start it and let it run for a very short period of time, stop it, start it again, etc., there is provided a cycling control which will first be briefly described by reference to the schematic diagram of FIG. 10. This cycling control as was described is rendered effective when the main control knob 47 is moved to its intermediate or "CYCLING" position in which contacts 47b and 47c are bridged as shown in FIG. 10 of the drawings. In addition, the cycling control of the present invention includes a low speed timing motor 76 drivingly connected to a toothed cam 77 which is adapted through cam follower or switch actuating means schematically designated as 78 periodically to open and close a normally open switch 79. One terminal 79a of the switch 79 is connected by means of a conductor 80 to the conductor 74 and consequently to the common contact 70. The other terminal 79b of the switch 79 is connected by conductor 81 with the switch contact 47c. It will be apparent that whenever the switch 79 is moved to the closed position, the blender motor 32 is energized and whenever the switch 79 is opened the blender motor 32 is deenergized.

So that the timing motor 76 may be selectively energized to operate for a predetermined number of intermittent operations or cycles, there is provided a contact carrier 82 also adapted to be driven by the slow speed motor 76 which carries an annular contact plate 83, best shown in FIG. 8 of the drawings. The annular contact plate 83 is formed of a good conducting material suitably mounted on the contact carrier 82 which carrier is preferably molded of a suitable plastic. Contact plate 83 is provided with a recess or notch 84 effectively to provide a discontinuous portion of the contact plate. So as to provide a smooth surface over the contact plate, the contact carrier 82 is provided with an integral projection 82a which effectively fills the recess or notch 84.

To complete the electrical circuit for the timing motor 76, there are provided a pair of terminals 86 and 87, each having a contact finger 86a and 87a, respectively, making sliding engagement with the contact plate 83. As illustrated in FIG. 10 of the drawings, one terminal of the motor 76 is connected by a conductor 88 to one side of the power cord 42 through the conductor 72. The other terminal of the motor 76 is connected by a conductor 89 to the terminal 87. Similarly, the terminal 86 is connected by a conductor 90 to the switch contact 47c through the conductor 81. Moreover, as shown in FIGS. 8 and 10 of the drawings, the contact finger 87a of the terminal 87 is in engagement with the insulating projection 82a of the contact carrier 82 and, consequently, the circuit through the motor 76 is interrupted at this point. This corresponds to the "OFF" position of the cycle selector button 48, shown in FIG. 2 of the drawings. If, however, the contact carrier 82 and its associated contact plate 83 were rotated to a position where the finger 87a of the terminal 87 was in engagement with the contact plate 83 and with the knob 47 set at the "CYCLING" position, as shown in FIG. 10 of the drawings, the timing motor 76 would be energized and would rotate the contact plate 83 and the cam 77 at a relatively slow speed causing periodic or intermittent closing and opening of the switch 79.

Referring now to the structural figures of the drawings, and particularly FIGS. 4, 5, 6, 7, 8 and 9, wherein the corresponding parts are designated by the same reference numerals as in the schematic diagram of FIG. 10, the timing motor 76 is effectively an electric motor and associated reduction gear mechanism suitably secured to the switch block of housing 50 by fastening means 91 (FIGS. 4 and 6). In view of the size of the timer motor 76, preferably a portion thereof extends outside shallow housing 50 and is housed within the base 16 of the blender 15. As illustrated in FIGS. 4 and 5 of the drawings, the timer motor includes an output shaft 92 which is adapted to be received in a socket 93 defined in cam 77, whereby the cam is directly driven from the timer motor shaft 92. In a device built in accordance with the present invention, the timer motor 76 was designed to drive the output shaft 92 at a speed approximately one-half revolution per minute and in a counterclockwise direction, as viewed in FIGS. 7, 8 and 10 of the drawings. It will be understood that this specific detail as to the speed of timer motor 76 is merely by way of example and not by way of limitation.

Preferably the shaft 92 and the socket 93 are suitably designed to insure a positive driving connection therebetween as by a flat on the shaft 92 and a corresponding flat in the socket 92 or other similar means. The cam 77 is preferably molded from a suitable plastic and for a purpose which will become apparent hereinafter is provided with an integral hub portion 77a on the exterior of which are provided a plurality of integral gear teeth 77b. As is best shown in FIGS. 4 and 5 of the drawings, these gear teeth do not cover the entire extent of the hub 77a but are discontinuous for a short area between the face 95 of the cam plate 77 from which the hub projects to define an annular area 94 (FIG. 4) around the hub 77a close to the face 95. The periphery of cam 77 is provided with a plurality of switch actuating teeth 77c on the periphery thereof. Also projecting from the hub portion 77a is an integral guiding extension 77d of reduced diameter, the purpose of which will become apparent from the ensuing description.

Considering now that switch 79 and referring primarily to FIG. 6 of the drawings, the switch 79 is illustrated as a single pole, single throw, normally open push button switch with a switch actuating lever or cam follower 78 which functions as a cam follower engaging alternately the teeth 77c of the cam 77 and the spaces between these teeth. To accommodate switch 79, the switch block or shallow housing 50 is provided with suitable integral projections for supporting switch 79. As illustrated best in FIG. 6, one portion of the switch is suitably supported on a pin 96 and suitable fastening means 97 permit the switch 79 to be not only secured and suitably mounted within the chamber 52, but also adjusted so that the switch actuating lever or cam follower 78 properly cooperates with the cam teeth 77c. To aid in accomplishing this, the fastening means 97 is preferably associated with means in the switch block 50 permitting limited pivotal movement about pin 96, thereby to insure accurate positioning, with respect to operation of the switch 79, between the teeth 77c of the cam follower 78. In a device built in accordance with the present invention, the cam 77 had twenty-eight equally spaced teeth 77c. Thus, with the cam 77 rotating at approximately one-half revolution per minute, the arrangement would insure twenty-eight cycles of "ON" and "OFF" operation of the blender motor 32 during a two minute period.

In order that the cam 77 may be set to a selected number of intermittent operations or cycles for any given operation and to insure that at the end of that selected number of cycles the timer motor 76 would become deenergized, there is provided a clutch member 100, best shown in FIGS. 4, 5 and 9 of the drawings. The clutch member is illustrated as a cylindrical or sleeve-like member preferably molded of a suitable plastic and adapted to be mounted in telescopic relationship with the hub portion 77a of the cam 77. The interior area of the sleeve-like clutch member 100 is provided adjacent one end thereof with short lengths of gear teeth 100a which, in the position shown in FIG. 4 of the drawings, are adapted to mesh with the gear teeth 77b provided on the hub 77a of the cam 77, but in the position of FIG. 5 of the drawings they are adapted to be out of clutching engagement with the teeth 77b. Axial movement of clutch member 100 relative to the hub 77a of cam 77 results in engagement and disengagement of the clutch provided thereby. As illustrated, the clutch member 100 is provided with an annular peripheral flange 100b which defines an abutment for one end of a compression spring 101, the other end of which, as clearly indicated in FIGS. 4 and 5 of the drawings, abuts the face 95 of the cam member 77.

The spring 101 normally biases teeth 100a into clutching or driving engagement with the teeth 77b of the cam 77, as shown in FIG. 4 of the drawings. The unclutched position is shown in FIG. 5 of the drawings.

For the purpose of driving the contact carrier 82 from the cam 77 when the clutch teeth 77b and 100a are engaged, the clutch member 100 is provided with a driving portion 100c projecting forwardly or to the left, as viewed in FIG. 4 of the drawings, from the flange 100b. This projection is receivable in a suitable cooperating opening 103 in contact carrier 82, which opening includes an extension of reduced cross-section 103a for receiving the projection 77d of the cam 77. The driving projection 100c is provided with a flat 104, as best shown in FIG. 9 of the drawings, which cooperates with a corresponding flat 105 (FIG. 8) defined within the recess 103 thereby insuring that the clutch member 100 and the contact carrier 82 and associated contact plate 83 will rotate as a unit.

So that the interment cycle control knob 48 may be applied to the intermittent cycle control means, the front wall 50a of the switch block or shallow housing 50 is provided with an opening 106 through which a central projection 82b of the contact carrier 82 extends, this projection having a flat 107 to cooperate with a corresponding flat within the knob 48. As is described in FIGS. 4 and 5 of the drawings, an annular area surrounding the opening 106 is depressed to define a recess 108. This recess is sufficiently deep so that the knob 48 may be depressed to the position shown in FIG. 5, whereby the clutch 100 is disengaged and rotation of the contact carrier 82 relative to the cam 77 may be accomplished. If, for example, the knob 48 were depressed and rotated in a clockwise direction one-quarter turn, the pointer 109 on the knob 48 would be adjacent the number 7 on the dial 49 indicating that, in effect, seven teeth of the cam 77 would intermittently engage the switch actuating lever or cam follower 78 to cause seven intermittent operations before the sliding contact finger 87a reached the insulated portion 82a, as shown in FIG. 8, and terminated the energization of the timing motor 76.

To facilitate providing the proper indicia for the dial 49 and the indicia adjacent the knob 47 as well as the push buttons 45, a suitable escutcheon plate 110 is preferably mounted on the front wall 50a of the switch block 50, as best shown in FIGS. 4 and 5 of the drawings. This escutcheon plate also will permit suitable decorative material to be placed thereon if desired.

In view of the detailed description included above, it will be obvious to those skilled in the art that there has been provided a blender which may be operated in the conventional manner heretofore employed, or may be operated through an intermittent operating cycle whereby the blender is turned on and off in successive periods for a selected predetermined number of intermittent operations. Briefly, however, with the cycling control knob 47, a shown in FIG. 10 of the drawings, the operator would depress the knob 48 and rotate it to a selected predetermined number of intermittent operations. This would rotate the contact carrier 82 and the contact plate 83 relative to the cam 77 so that a circuit would be completed from one side of power cord 42 through conductor 73, switch contacts 47b and 47c, conductor 81, contact finger 86a, contact plate 83, contact finger 87a, conductor 89, timing motor 76, conductor 88 and conductor 72 to the other side of power cord 42 to energize timing motor 76 with the resultant rotation of the cam 77 as well as contact carrier 82. This results in periodic closing and opening of the switch 79 with the periodic or intermittent starting and stopping of the blender motor 32. After the selected number of intermittent operations have expired, the cam follower 82 would have rotated back to the position shown in FIG. 10 of the drawings deenergizing the timer motor 76.

Although a particular mechanical arrangement for providing automatic intermittent starting and stopping of the blender motor for a selected number of cycles has been illustrated and described, it will readily be understood by those skilled in the art that a cyclical speed change such as energizing blender motor 32 at a high speed, then at a low speed, etc., could equally be employed to insure efficient operation.

While there has been shown and described a particular embodiment of the present invention, it will be understood that various changes and modifications of the invention will occur to those skilled in the art. It is aimed in the appended claims to cover all such changes and modifications as fall within the true spirit and scope of the present invention.

What is claimed as new and desired to be secured by Letters Patent of the United States is:

1. A motor operated electric appliance comprising an electric motor for powering said appliance, a timing motor, a cam driven by said timing motor, switch means actuated by said cam for alternately energizing and deenergizing said electric motor in cyclic fashion, first means for selectively controlling said electric motor either for continuous operation or for cyclic on-off operation, means for selectively controlling the speed for said motor regardless of the condition of said first means, a rotatable contact member driven by said timing motor, means for adjusting the relative position between said contact member and said timing motor to start said cyclic operation and to determine the number of cycles of energization and deenergization of said motor when said first mentioned means is set for cyclic operation, and means associated with said contact member for automatically terminating the cyclic operation of said motor at the end of said selected number of cycles.

2. A motor operated electric appliance comprising an electric motor for powering said appliance, a timing motor, a cam driven by said timing motor, switch means actuated by said cam for alternately energizing and deenergizing said electric motor in cyclic fashion, control means having a first position for insuring continuous operation of said electric motor and a second position wherein cyclic on-off operation of said electric motor will result, means for selectively controlling the speed of said motor regardless of the position of said control means, circuit means for energizing said timing motor when said control means is in said second position, said circuit means including a rotatable contact member driven by said timing motor, means for adjusting the relative position between said contact member and said timing motor to start said cyclic operation and to determine the number of on-off cycles of said motor when said control means is in said second position, and means associated with said contact member for automatically terminating the cyclic operation of said motor at the end of said selected number of cycles.

3. A motor operated electric appliance comprising an electric motor for powering said appliance, a timing motor, a toothed cam driven by said timing motor, switch means alternately opened and closed by said cam for alternately energizing and deenergizing said electric motor in cyclic fashion, control means having a first position for insuring continuous operation of said electric motor and a second position wherein cyclic on-off operation of said electric motor will result, means for selectively controlling the speed of said motor regardless of the position of said control means, circuit means for energizing said timing motor when said control means is in said second position, said circuit means including a rotatable contact member driven by said timing motor, means for adjusting the relative position between said contact member and said timing motor to start said cyclic operation and to determine the number of on-off cycles of said motor when said control means is in said second position, and means associated with said contact member for automatically terminating the cyclic operation of said motor at the end of said selected number of cycles.

4. A motor operated electric appliance comprising an electric motor for powering said appliance, a timing motor, a cam having a plurality of teeth on the periphery thereof driven by said timing motor, control means having a first position for insuring continuous operation of said eletcric motor and a second position wherein cyclic on-off operation of said electric motor will result, switch means connected in circuit with said electric motor when said control means is in said second position, cam follower means interposed between said teeth and switch means, circuit means for energizing said timing motor when said control means is in said second position, said circuit means including a rotatable contact member driven by said timing motor, means including a clutch for adjusting the relative position between said contact member and said timing motor to start said cyclic operation and to determine the number of on-off cycles of said motor when said control means is in said second position, and means associated with said contact member for automatically terminating the cyclic operation of said motor at the end of said selected number of cycles.

5. In an electric blender, an electric motor for powering said blender, cam operated switch means for energizing and deenergizing said motor in cyclic fashion, control means for selectively controlling said motor either for continuous operation or for cyclic on-off operation, a rotatable contact plate for selectively determining the number of cycles of energization and deenergization of said motor when said control means is set for cyclic operation, and means for automatically terminating the cyclic operation of said motor at the end of said selected number of cycles.

6. In an electric blender, an electric motor for powering said blender, cam operated switch means for energizing and deenergizing said motor in cyclic fashion, control means for selectively controllnig said motor either for continuous operation or for cyclic on-off operation, means for selectively controlling the speed of said motor regardless of the condition of said control means, a rotatable contact carrier and contact plate for selectively determining the number of cycles of energization and deenergization of said motor when said control means is set for cyclic operation, and means on said contact carrier for automatically terminating the cyclic operation of said motor at the end of said selected number of cycles.

7. In an electric blender, an electric motor for powering said blender, a timing motor, a toothed cam driven by said timing motor, switch means actuated by the teeth on said cam for alternately energizing and deenergizing said electric motor in cyclic fashion, control means for selectively controlling said electric motor either for continuous operation or for cyclic on-off operation, push button means for selectively controlling the speed of said motor regardless of the condition of said control means, a rotatable annular contact member driven by said timing motor, means including a clutch for adjusting the relative position between said contact member and said timing motor to start said cyclic operation and to determine the number of cycles of energization and deenergization of said motor when said control means is set for cyclic operation and means including a discontinuous portion on said contact member for automatically terminating the cyclic operation of said motor at the end of said selected number of cycles.

8. An electric appliance comprising an electric motor for powering said appliance, cam operated switch means for energizing and deenergizing said motor in cycles of successive on-off operation, means for selectively controlling said motor either for continuous operation or for cyclic on-off operation, means for selectively controlling the speed of said motor regardless of the condition of said control means, a rotatable contact carrier and contact plate for selectivity determining the number of cycles of energization and deenergization of said motor when said first mentioned means is set for cyclic operation, means including a clutch for driving said contact carrier from said cam, and means on said contact carrier for automatically terminating the cyclic operation of said motor at the end of said selected number of cycles.

9. The appliance of claim 4 wherein said clutch comprises a sleeve having internal teeth and said cam includes a hub with cooperating teeth for engaging said internal teeth.

10. The appliance of claim 9 wherein axial movement of said sleeve renders said clutch effective to release said contact member from driving engagement with said timing motor.

11. The appliance of claim 4 wherein said rotatable contact member is driven from said cam.

12. The appliance of claim 10 wherein a torsion spring biases said clutch to a position whereby said contact member is driven by said timing motor.

13. The appliance of claim 8 wherein said contact plate is provided with a notch, and a stationary contact finger engages said contact plate, a timing motor for rotating said contact carrier, said contact finger and contact plate being connected in the energization circuit of said timing motor whereby said timing motor is deenergized when said contact finger reaches said notch.

14. The blender of claim 6 wherein said means for selectively controlling the speed of said motor comprises a plurality of push buttons.

15. The blender of claim 7 wherein a control knob is provided to select the number of cycles of alternate energization and deenergization of said electric motor, the number of cycles selected depending on the angular rotation of said knob, the driving connection between said timing motor and said contact member being rendered ineffective upon depression of said knob.

References Cited

UNITED STATES PATENTS

| | | | |
|---|---|---|---|
| 2,548,028 | 4/1951 | Klammer | 318—486 X |
| 2,767,332 | 10/1956 | Willard | 307—132 |
| 2,912,633 | 11/1959 | Nebinger | 307—141 X |

ORIS L. RADER, Primary Examiner

T. LANGER, Assistant Examiner

U.S. Cl. X.R.

318—486